Patented Oct. 14, 1930

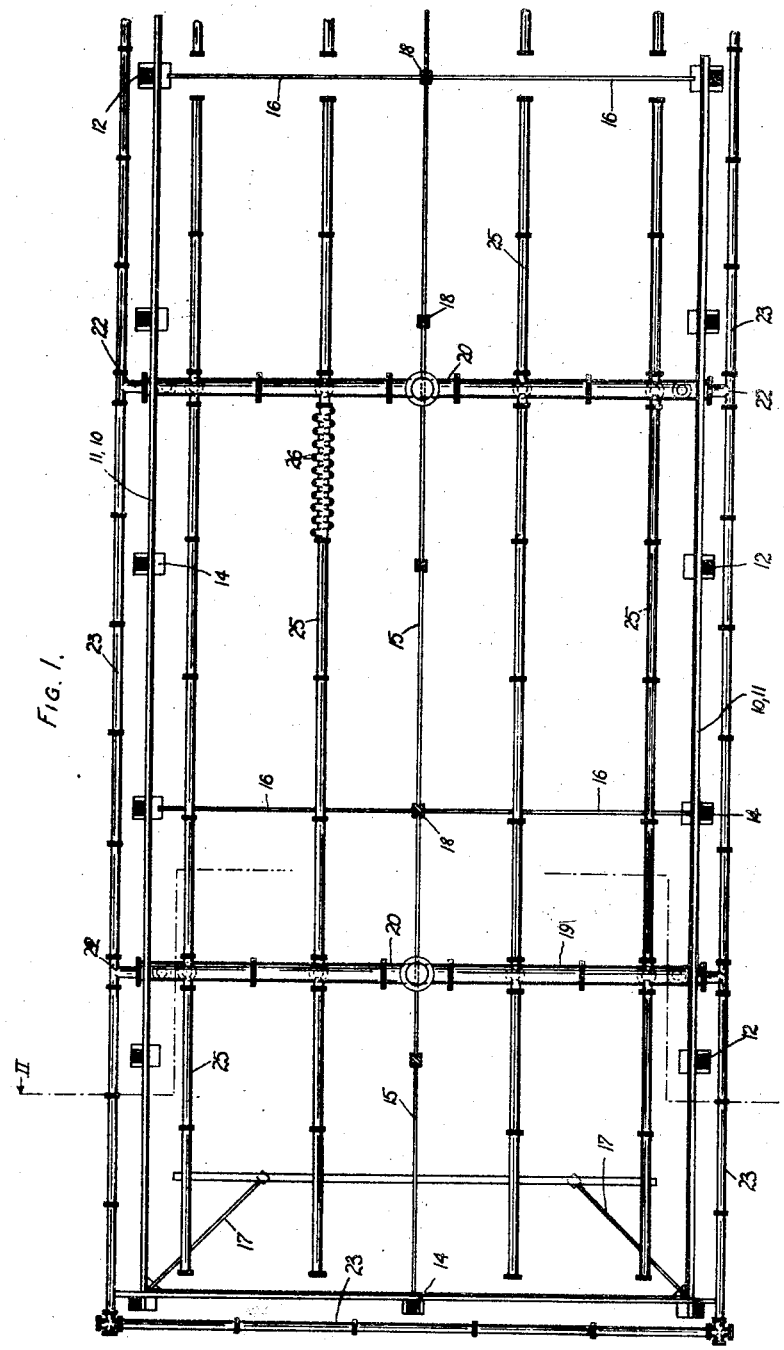

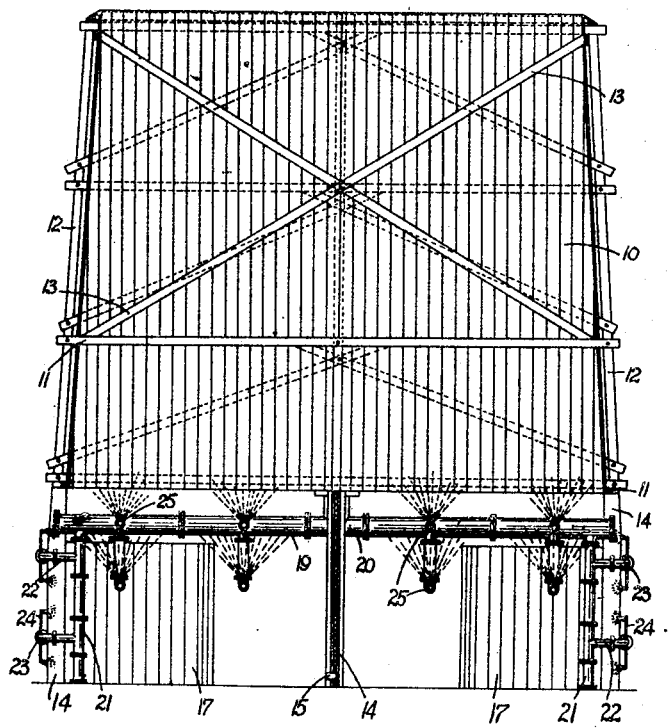

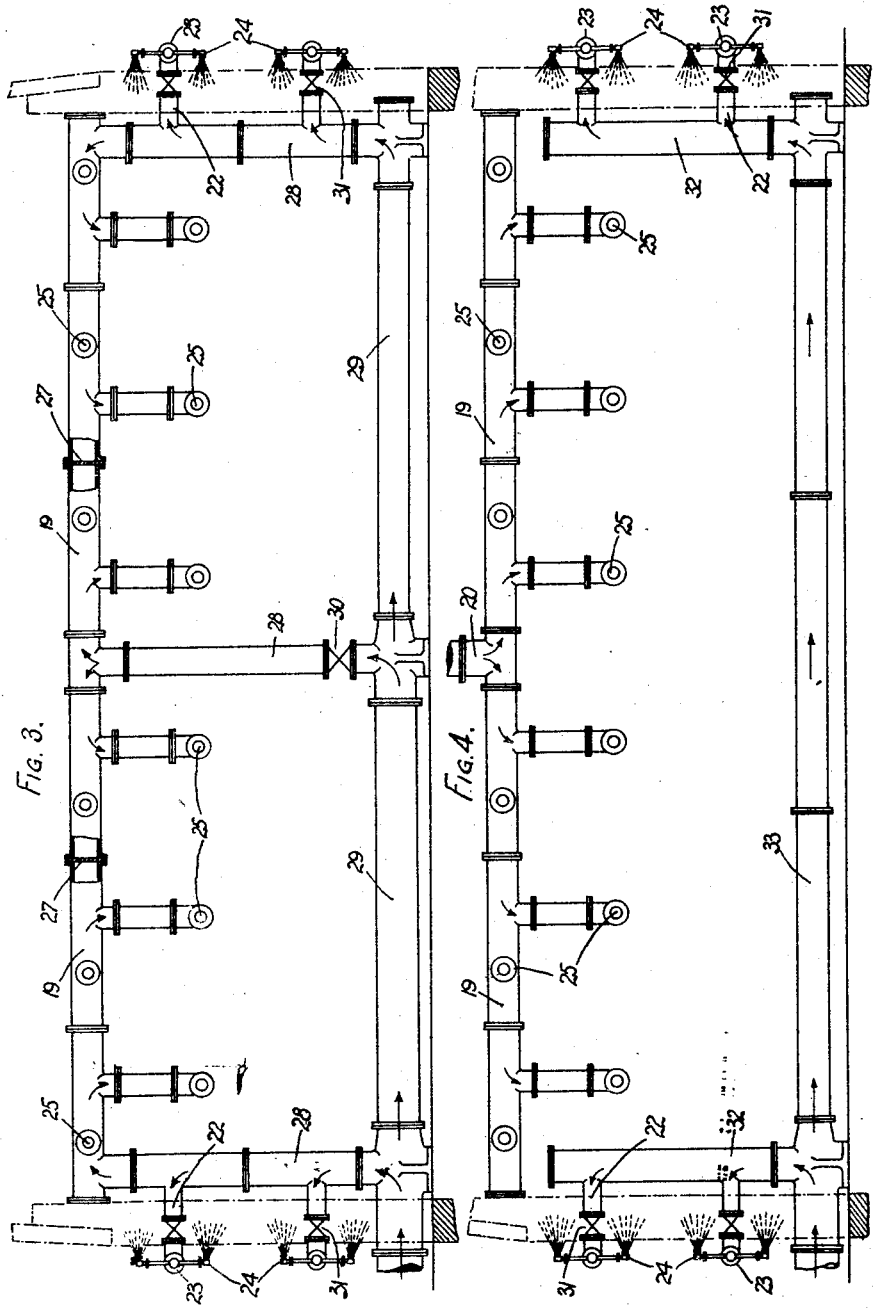

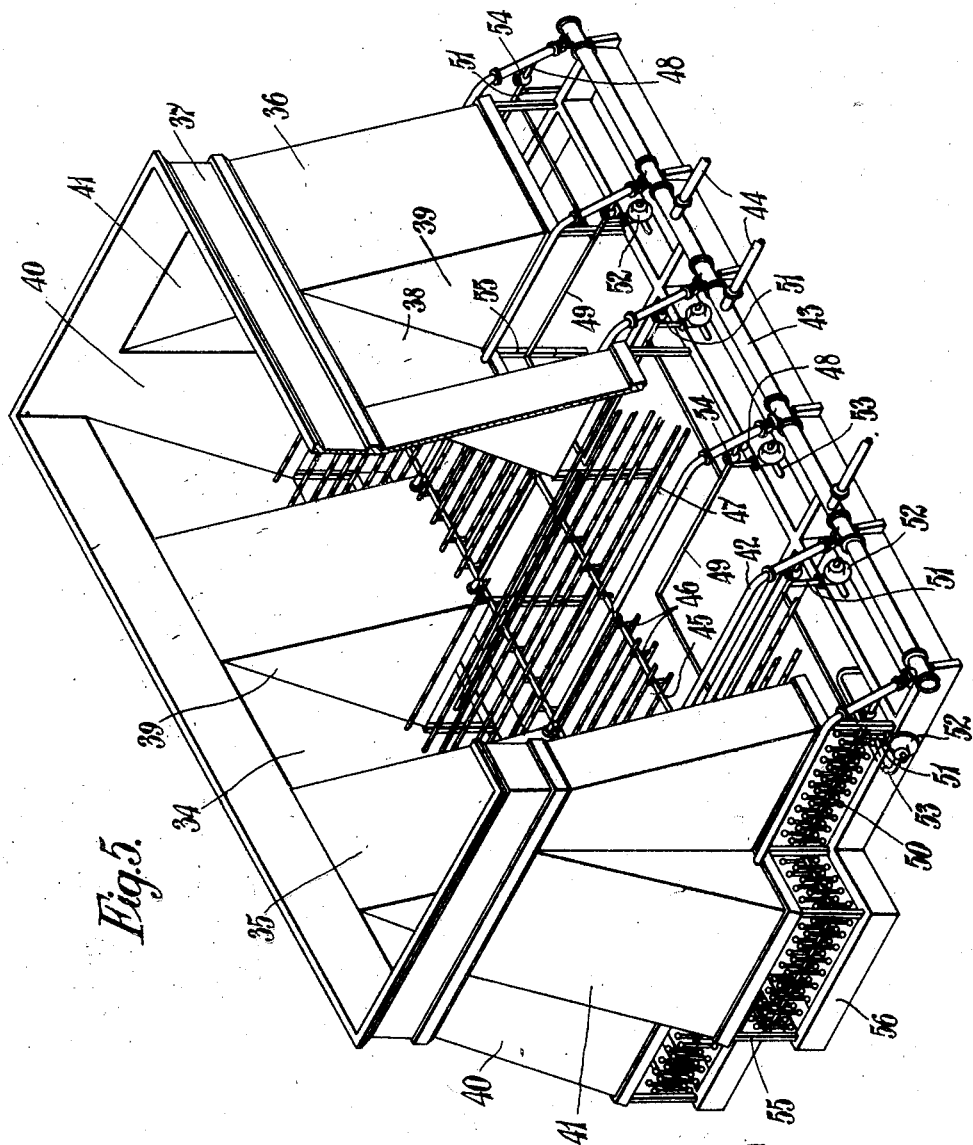

1,778,364

UNITED STATES PATENT OFFICE

ROBERT ARTHUR LEWIS, OF CARDIFF, WALES

COOLING TOWER

Application filed April 29, 1927, Serial No. 187,644, and in Great Britain April 29, 1926.

This invention concerns improvements in or relating to cooling towers and has for its main objects the more effective cooling of the heated inlet water or the like in relation to the available condition of the cooling medium employed, namely the air at the atmospheric conditions ruling; and the enabling of this effect to be obtained by means of a plant which occupies the smallest possible ground area. The degree of cooling of large quantities of water such as are used for condensing purposes et alia, obtained by means of exposure thereof to atmospheric air in a cooling tower, depends, for fixed conditions of air and water respectively, mainly on the extent to which the following conditions are secured:—the presentation of the liquid in a form which exposes the greatest amount of surface to the cooling medium; the securing of the greatest flow of air possible through the space in which the elements are intermixed; the provision of an arrangement for ensuring the intermixture of the elements in such a manner that the surfaces in contact are constantly changing, that is, that the currents of air and water shall be in a relative state of agitation, to ensure the maximum interchange of heat, and the saturation as far as possible of the cooling medium prior to its exit from the tower.

The accepted practice hitherto has been to pump the water into a series of distributing troughs placed at varying heights above the level of the pond in the base of the tower. From these troughs the water is allowed to fall under the action of gravity through the uprising current of air caused by the natural draught of the tower over a series of wooden hurdles, laths, or other baffle devices fixed with the object of delaying its passage to the underlying pond, its fall taking place in the form of comparatively large drops, or in films adhering to the bafflework, which expose one surface only to the incoming air. This bafflework occupies a considerable proportion of the space in the base of the tower, and to that extent hinders the passage of air through the tower. By reason of its bulk it acts as a heat equalizer, tending to give a steady temperature gradient through the active part of the tower. If made of perishable material, it requires occasional renewal.

It has, however, been suggested to spray the water upwardly and inwardly at the base of the tower. The present invention relates to such an arrangement and is primarily characterized by the provision of a cooling-tower comprising an open base portion, an unimpeded casing or shell thereabove, means disposed wholly within the base of the tower for spraying water vertically upwards, and further means forming water screens around the base of the tower to spray water inwardly into the base thereof. The water that is sprayed upwards travels first in substantially the same direction as the uprising current of air and subsequently falls by gravity against the flow of the air current to the collecting tank below, its fall being retarded and time of contact with the air current increased by the sustaining effect of the air current acting on the minutely subdivided liquid.

The spraying devices producing this vertical spray of water occupy little space, and are so arranged that they produce a bank of fog or mist inside the tower of such depth as to ensure maximum saturation of the air during its passage. Practically the whole of the base of the tower is available for this action, so that less space is required to produce a result equivalent to that obtained in the wooden splashwork tower. In addition, the upward ejection of the water from the numerous atomizer nozzles materially adds to the velocity of the upward air current in a manner independent of the temperature effect, which is of considerable advantage in reducing the necessary height of the tower casing required.

It is the usual practice, to prevent water being blown out of a cooling-tower by wind, to enclose the base of the tower with louvres, that is, parallel planks or plates set at an angle so that there is no clear horizontal passage into the base of the tower, thereby to some extent interfering with the free flow of air into the base of the tower. I dispense with these screens, their place being taken by the side-sprays mentioned above, which are constituted by a screen of spray ejector nozzles, spaced equally a few feet apart (independently controlled, if desired,) and discharging inwards, the effect being that the flow of air into the tower caused by the natural temperature draught and the action of the internal atomizer units mentioned above is considerably augmented.

The ejection of water by wind from the base of the tower is prevented by the action of the side sprays, together with a further provision of vertical internal partitions in the base of the tower whereby it is separated into compartments which form effective windbreaks.

Where considerations of space make it desirable, the draught of the tower can be further increased by isolating the side sprayer units, i. e. feeding them independently of the other sprays, and passing the inlet water to them at a higher pressure, or, further still, by passing the whole of the inlet water through the interior vertical sprayers at the necessary increased pressure, and feeding the side sprayers with water taken from the collecting pond of the tower, at the necessary pressure; this water being thus sprayed twice, adding to the draught with less detraction from the cooling capacity of the air flow.

In order that the invention may be more readily understood, reference will now be made to the accompanying drawings illustrating some embodiments thereof by way of example, and wherein:—

Fig. 1 is a plan view of a portion of the base of one form of cooling tower,

Fig. 2 being a transverse sectional view, taken on the line II—II of Fig. 1, of the complete tower;

Figs. 3 and 4 are transverse sections showing further forms of the tower-base feed-systems;

Fig. 5 is an isometric view of a different type of tower.

Referring firstly to Figs. 1 and 2, the tower proper shown therein consists of a wooden or other shell 10 carried by a frame composed of horizontal and vertical members 11 and 12 respectively and diagonal ties 13 secured together in any convenient manner, this frame being supported on pillars 14 of steel, concrete or the like extending, say 10–15 feet above the ground level.

The "base" of the tower, i. e., the portion below the shell 10, is not, as is common with cooling towers of ordinary form, enclosed within a louvre-like structure of planks but is left open. To prevent being carried out of the tower by wind, partitions 15 and 16 extending in the longitudinal and transverse directions respectively of the tower are provided, further inclined wind-breaks 17 being also preferably used. These partitions, the action of which is assisted by the screen of side-sprays hereinafter described, are supported on the main pillars 14 and auxiliary pillars 18.

Extending transversely across the tower slightly below the shell 10 (Fig. 2) and at convenient intervals apart in the longitudinal direction thereof are feed-pipes 19 fed with the water to be cooled by vertical T-pieces 20. These pipes at their extreme ends (which are closed) carry downwardly-extending pipes 21 (Fig. 2) which in turn carry horizonal T-pieces 22 feeding horizontal pipes 23 extending completely round the tower exteriorly thereof. These pipes 23 carry single or multiple atomizing or spraying devices 24, which form screens of water extending inwardly into the base of the tower. In addition the feed-mains 19 carry a series of pairs of pipes 25 having integral pockets or lugs 26 (Fig. 1) to receive metallic atomizer units, these atomizers being arranged to spray the water fed to them in a substantially vertical direction. These spraying-devices, of course, extend along the entire length of the pipes 25.

Since these atomizers spray the water in the same direction as the uprising current of air in the tower the velocity of the air is considerably increased in a manner independent of the temperature conditions, which is an advantage in reducing the necessary height of the tower. Moreover, the action of spraying the water vertically upwards increases the cooling effect materially, by reason not only of the fine subdivision of the water but also because of the increased length of time in which the water and air are in contact during the passage of the water first upwardly and then downwardly against the sustaining action of the air current. The atomizer units, being of incorrodible metal, are practically indestructible and present the further advantage of occupying little space in the tower, which can thus be of much smaller size than usual.

In addition to the cooling action obtained on the water sprayed by the side-atomizers, this injected water also increases the air-draught into the tower and prevents ejection of water by wind therefrom.

The air which passes the screen of side sprayers is greatly in excess of that required to cool the side discharge water, and is therefore capable of cooling that discharged by the internal sprayers, the whole arrangement being proportioned to make maximum use of the cooling medium before its exit from the casing. The increase in velocity of the entering air due to its free passage and the action of the side sprayers, improves the cooling conditions in the centre portions of the tower so that a wider tower can be effectively operated than in the case of existing designs.

Turning now to the arrangement shown in Fig. 3, in this construction the cross-mains 19 are separated by plates or "blank" flanges 27 into three portions fed by three rising mains 28 from a lower feed-pipe 29, the risers 28 carrying side-spraying assemblies 22—24 and the mains 19 carrying the interior atomizing pipes 25 as in the previous arrangement. The riser feeding the central portion of the mains 19 is provided with a shut-off valve 30 and the pipes 22 are provided with valves 31 by which the side-sprays may be controlled if desired.

Similar valves 31 may be provided in the arrangement according to Fig. 1 if necessary.

With the arrangement shown in Fig. 3, which is used with towers slightly greater in width than that shown in Figs. 1 and 2, it will be observed that the closing of the valve 30 will put the centre sections of the pipes 19 out of action to give a second condition of operation. These sections are the least effective from the cooling point of view. During hot weather the tower could be worked with this valve closed and the feed-head increased to obtain the normal discharge of water in the tower, this increase being obtained without difficulty with the usual motor-driven pumps employed.

While operating with the valve 30 closed the pressure in the mains 28 at the sides will be higher and consequently the draught-inducing action of the side sprayers will be more marked in relation to the general discharge. The increased atomizing at higher pressures ensures more effective cooling and enables the attainment of as low a temperature in hot weather as in cold with only small proportional increase in power expended in pumping.

A somewhat similar arrangement is shown in Fig. 4, where the overhead mains 19 and spray-pipes 25 are similar to those shown in Figs. 1 and 2 but the side-sprayers 22—24 are fed independently from rising-mains 32 connected to a feed-main 33 extending across the base of the tower similarly to the main 29 in Fig. 3. The pipes 32 might be connected to the pipes 19 by means of isolating valves if desired.

The side-sprayers are preferably fed with the water to be cooled at a higher pressure than that of the cross-mains 19. In hot weather this water for the side sprayers could be taken from the pond or sump at the bottom of the tower and the whole of the water to be cooled passed through mains 19 at a higher pressure.

Such an arrangement, i. e. one wherein the side-sprayers may be isolated and fed from the sump of the tower, is shown in Fig. 5, which also shows a form of tower wherein the base of the tower is so arranged that practically any quantity of water may be cooled in a single casing of economical design with adequate air entry at every point, thus obviating the disadvantage of existing arrangements usually requiring, for adequate air supply, the use of several units spaced at considerable distances apart. The design is also such that no internal bracing is required to ensure stability, this construction naturally reducing the cost of the tower.

The tower casing comprises a series of long transverse bays 34 and alternate short connecting bays 35, the long bays having lean-to roofs 36 running inwardly to the top 37 of the casing, and the short bays having similar roofs 38 sloping outwardly, the weight of the casing being thus distributed over a large area. The roofs are connected by vertical triangular walls 39, and the ends 40 of the casing are provided with small bays 41, as shown.

The main supply of water (to be sprayed vertically within the tower) is taken from horizontal mains 42 fed from a longitudinal main 43 in turn fed from supply pipes 44. The horizontal mains 42 carry longitudinal pipes 45 to which are secured short vertical pipes 46, and the latter, in turn, carry transverse horizontal pipes 47 in which the spray nozzles are mounted. Owing to the necessarily restricted size of the drawing, these nozzles are not precisely indicated, but they may be assumed to be of the same form as that indicated at 26 in Fig. 1. In addition, the horizontal mains 42 are provided with auxiliary pipes 48 to which are connected further pipes 49 extending completely around the whole of the periphery of the tower, including the re-entrant portions thereof. These latter pipes carry the nozzles 50, mounted on vertical pipes in the same manner as indicated in Figs. 2 to 4, to spray water inwardly into the base of the tower and thereby produce a bank of mist inside the tower.

The pipes 48 are connected at 51 to centrifugal pumps 52 which are adapted to collect water from the sump or pond in the bottom of the tower by way of pipes 53. Between such connections and the mains 42, the said auxiliary pipes 48 are provided with valves 54, by which, under automatic or manual control as desired, the pipes 49 may be disconnected from the said mains and supplied by way of the pumps mentioned from the sump or pond at the bottom of the tower. It is to be understood, of course, that the said sprayers are mounted along the whole length of the pipes 49, although they have only been partially shown in the drawing for the sake of clearness. The main casing of the tower is supported by pillars 55 from a suitable base 56.

Clearly the various forms of atomizing pipes described might be modified or combined in various ways without exceeding the scope of the invention.

By reason of these improvements it becomes an economical proposition to provide cooling towers of permanent construction, the casings being preferably made of ferro-concrete and the spray units of imperishable material and to obtain the desired result in a plant of the most compact form, occupying the minimum ground space, thereby reducing the first cost of the complete installation and the contingent supply piping, and facilitating operation.

The independent operation of the side sprayers and the characteristics of the atomizer pipes make it possible to provide a flexible plant for dealing with adverse weather conditions as operation at an increased pressure gives higher nozzle discharge velocities and finer atomization.

Owing to the low temperatures at which the circulating water is passed to cooling towers, contingent to modern turbine practice, the draught effect in the ordinary tower is seriously affected by high temperatures of the external air.

The improvements outlined describe a means by which a plant which is adequate under normal conditions can be so designed and operated that by the temporary expenditure of a correspondingly increased power in pumping, abnormal conditions can be conveniently met without the necessity for providing a margin of plant for dealing with these conditions, a point of much economic importance.

What I claim is:—

1. A cooling tower, comprising a base which is completely open on all sides, an unimpeded casing thereabove, water mains extending horizontally across the top of the base at the bottom of the casing, short vertical pipes connected to the mains, horizontal pipes carried by said vertical pipes and extending across the base for spraying water vertically upwards, other vertical water supply pipes disposed at the edge of the base, and spraying devices connected with said vertical pipes and extending around said base to spray water laterally inward into the same and thereby produce a bank of fog or mist inside the tower.

2. A cooling tower, comprising a base which is completely open on all sides, an unimpeded casing thereabove, water mains extending horizontally across the top of the base at the bottom of the casing, short vertical pipes connected to the mains, horizontal pipes carried by said vertical pipes and extending across the base for spraying water vertically upwards, other vertical water supply pipes disposed at the edge of the base and leading to said cross-mains, and spraying devices connected with the second-named vertical pipes and extending around said base to spray water laterally inward into the same and thereby produce a bank of fog or mist inside the tower.

3. A cooling tower, according to claim 2, in which the horizontal spraying pipes carried by the short vertical pipes are disposed at the bottom of the casing, while the lateral spraying devices connected with the last-mentioned vertical pipes extend entirely around said base at the periphery thereof.

In testimony whereof I hereunto affix my signature this 14th day of April, 1927.

ROBERT ARTHUR LEWIS.